COLOR CONVERTER FOR BLACK AND WHITE TELEVISION SETS

Filed May 22, 1967

5 Sheets-Sheet 1

INVENTOR.
FREDERICK V. TOPPING
BY
Westell & Hanley

INVENTOR.
FREDERICK V. TOPPING

BY Westell & Hanley

COLOR CONVERTER FOR BLACK AND WHITE TELEVISION SETS

Filed May 22, 1967

INVENTOR.
FREDERICK V. TOPPING

BY

Westell & Hanley

←|→ ORDER OF COLOR DESIGNATIONS

ORDER OF COLOR STRIPES ON BELT FLIGHTS:

← RBG (GOING LEFT)

GBR → (GOING RIGHT)

INVENTOR.
FREDERICK V. TOPPING
BY
Westell & Hanley

Oct. 20, 1970 F. V. TOPPING 3,535,435

COLOR CONVERTER FOR BLACK AND WHITE TELEVISION SETS

Filed May 22, 1967 5 Sheets-Sheet 5

INVENTOR.
FREDERICK V. TOPPING

BY

Westell & Hanley

United States Patent Office 3,535,435

Patented Oct. 20, 1970

3,535,435

COLOR CONVERTER FOR BLACK AND WHITE TELEVISION SETS

Frederick V. Topping, 3 Kirkton Ave., Toronto, Ontario, Canada

Filed May 22, 1967, Ser. No. 640,069
Int. Cl. H04n 9/12
U.S. Cl. 178—5.4 14 Claims

ABSTRACT OF THE DISCLOSURE

This invention providing a moving belt with slightly sloping lines where two flights of the belt are superimposed in the path of light transmitted from a black and white television screen and the belt movement in synchronism with the vertical scan and coloring means for such light causes transparencies to move downwardly across the belt of a color corresponding to that being fed to the color television set, with different colors so following one another cyclically. The result is color television pictures.

My invention is a device of practical dimensions and construction, which when placed in front of a conventional black and white television picture screen, and connected in a simple way to the television receiver and the black and white picture tube therein, will adequately effect the reproduction of a transmitted color picture, when viewed therethrough.

The principle of the invention is based on the well known observation (references—Proceedings of the IRE, October 1951 and Radio Electronics, January–February 1956) that the effect of color pictures may be reproduced by displaying the color content of a picture, frame sequentially; wherein the color distribution of a particular color relating to the picture is viewed in that color, during one complete vertical scan (frame) of the television picture screen, and the color distribution of another particular color is viewed during the subsequent frame, and so on as desired, the process repeating cyclically, and that this will produce on the viewer, the effect of a complete color picture.

There are also means well known to those skilled in the art, of extracting from the receiver, the transmitted color information, the vertical scan synchronizing information, and means for applying the extracted color information relating to a particular color to the picture tube screen, for any predetermined color, during a complete vertical scan, and for subsequent colors during subsequent vertical scans, cyclically, as required.

This invention therefore, relates to an optical filter or tinting mechanism through which a black and white picture tube screen may be viewed, which changes its color bandpass characteristics in continuous synchronism with the vertical scan, cyclically, as required, and which is arranged by well known means to be in synchronism with the frame sequential color information provided to the black and white picture tube screen.

The importance of the synchronous characteristic of this invention may be explained by consideration of the nature of the illumination of a picture tube screen supplied with frame sequential information relating to a particular color. At the start of a vertical scan, the horizontal scan commences at the top of the picture tube screen, and will consist, in a frame sequential system, of picture information relating to a predetermined color, for example, red. After the horizontal scan has progressed downwards to the completion of a vertical scan (frame), the lower third, approximately, of the picture screen will be visibly illuminated with red information due to the persistence characteristics of the picture tube screen phosphor. It is therefore necessary that the optical filtering or coloring causes the lower third of the picture tube to appear red. The subsequent frame may provide illumination relating, for example, to green picture information, and since this will commence for the subsequent vertical scan at the top of the picture tube screen contemporaneously with the persistence of red information at the bottom of the picture tube screen, it is necessary that the optical filter bandpass pass different colors in different viewing areas of the picture tube screen at the same time and be synchronized with the progression of the horizontal scan during a vertical frame. That is, the chromatic optical filter characteristics must be in synchronism with the vertical progression of the horizontal scan lines, when the scan lines are causing the picture tube screen to be illuminated with predetermined chromatic information, frame sequentially.

Other advantages of this device are, that it may be made in rectangular form, it interposes a minimum of optical attenuation through a thin screen, employs only relatively low speed moving parts and does not require precise location or alignment relative to the picture tube screen. The means whereby these, and other advantages of my invention are obtained is described more fully in the detailed descriptions and drawings which follow.

The invention generally provides that a belt (by "belt" herein I mean "endless belt") with major portions of the two flights thereof arranged to provide parallel vertical planes will move said planes in opposite directions horizontally in front of the television screen. The belt is provided with a sequence of nearly vertical stripes which slope just enough so that the upper end of such stripe is advanced an integral number of stripe widths up to five stripe widths ahead of the lower end of the stripe over the height of a frame for the television set with which the converter is to be used, adjusted for flyback time.

It will be seen hereafter that belt travel is synchronized with the vertical scan. To achieve this, the vertical scan height used for calculation must be increased 8–10% to allow for the fact that sets are usually adjusted so that actual frame height is approximately 10% larger than the visible picture, in other words, the upper and lower 5% of the transmitted picture are not seen, and the vertical scan height for the purposes of line slope dimensional calculations must be further considered as increased by an amount equal to the vertical travel velocity of the scan, times the flyback time. In other words line slope calculations are based on the vertical distance the scan would travel at its normal rate from the top start of a scan to the next top start. This will be called the "adjusted frame height." The horizontal displacement of a belt stripe over the adjusted frame height, is known herein as the "horizontal offset distance." The slope suggested is very slight as will be realized from the fact that the preferred line thickness is .022 (measured horizontally over an adjusted frame height of 14 inches for a 19" screen). It will be seen, in this manner, there is provided an optical arrangement whereby transparencies represented by intersecting stripes of the two belt flights will travel the adjusted frame height in the travel by the belt of a distance equal to the offset of the top of a line to the bottom over the adjusted frame height. As will be appreciated more clearly hereafter, this will be done in the vertical scan time. A vertically striped screen with strips of contrasting optical qualities is aligned with planar portions of the belt flights to affect the quality of light transmitted therethrough and to achieve selection and/or coloring of transparencies. Colored fixed filters may be optically aligned with the belt and the screen where desired to modify or vary the color effects produced by the transparencies and the striped screen.

By "vertical scan time" herein I mean the downward travel time plus the fly-back time.

By a proper selection of opaque and transparent areas on either the belt or the vertically striped screen, optically aligned with the plane portion of the belt flights and approximately aligned with the black and white television set with which the device is used, selected ones of the aforementioned transparencies (with or without a modifying fixed filter) may be made to sequentially supply coloring to the picture on the black and white screen with single hues produced by aligned light transmitting members corresponding to such transparencies travelling vertically across the adjusted frame height in a time corresponding to the downward vertical scan plus the flyback time. Moreover in accord with such proper selection, the transparencies may be made to successively provide transparencies of different hues, adequate to provide when cyclically coloring the picture, to cause the illusion of all the hues normally to be portrayed in color television. The belt may easily be driven by a motor which is controlled to drive the belt in synchronism with the vertical television scan, by extracting from the television set a synchronous signal indicative of the vertical scan cycle in a manner well known to those skilled in the art. Where necessary, this synchronism may be checked against the actual belt travel by providing a comparison signal from a device actuated in accord with actual belt travel such as a photocell actuated by the stripes on the moving belt. As the transparencies of a selected hue or color are moving down the screen, the television set is connected in manners well known to those skilled in the art to supply the color information to the scan corresponding to the hue created by the transparencies travelling down the screen in combination with the optically aligned screen, with or without a fixed filter. Because the vertical height of the illuminated portion on the television screen measured upwardly from scan to fade is about 30% of the height of the screen, the widest portion of the travelling transparencies may be selected to provide the optimum illumination. By the selected cyclic succession of such coloring, light passing from said television set through said belt, colored and moving in synchronism with the corresponding color information and the vertical scan, colored television pictures may be provided in front of a black and white set.

Since the belt lines may be made very narrow (between .001" and .125" and preferably .022") and the belt need only move the horizontal offset distance during the vertical scan time, it will be seen that the belt movement may be very slow and hence a mechanical means of providing color television has been found free of vibration or noise. For example in applicant's preferred design the lines are .022 inches wide and the horizontal offset one stripe width and the vertical scan time (including flyback) is $1/60$ of a second. The preferred belt speed is therefore $.022/1/60=1.32$ inches per second or .110 ft./sec., a very slow speed. Such speed may be achieved without objectionable vibration or noise.

The upper limits on horizontal belt strips width are set by the ability of the viewer to distinguish individual transparencies in the pattern created by the stripes. The stripes must be smaller, in horizontal width than the value at which this will occur, and while this is to some extent a subjective matter varying with the individual viewer and his normal viewing distance, the problem of size is therefore similar to that, in television pictures, of the width and spacing of the horizontal scan lines. The belt lines cannot be wider than .125" and preferably will be much closer to .022". The minimum stripe width will be set by problems of parallax, co-lineation and production tolerances and should be at least .001".

It will be noted that whereas color television is ordinarily thought of as employing three colors, that it is above stated that the cyclic succession of transparencies may only involve two colors. This is because, as shown by Dr. Land and others—see "Scientific American," May 1959—the portrayal of two colors will give an adequate impression of any desired color.

In drawings which illustrate a preferred embodiment of this invention:

Figure 1:
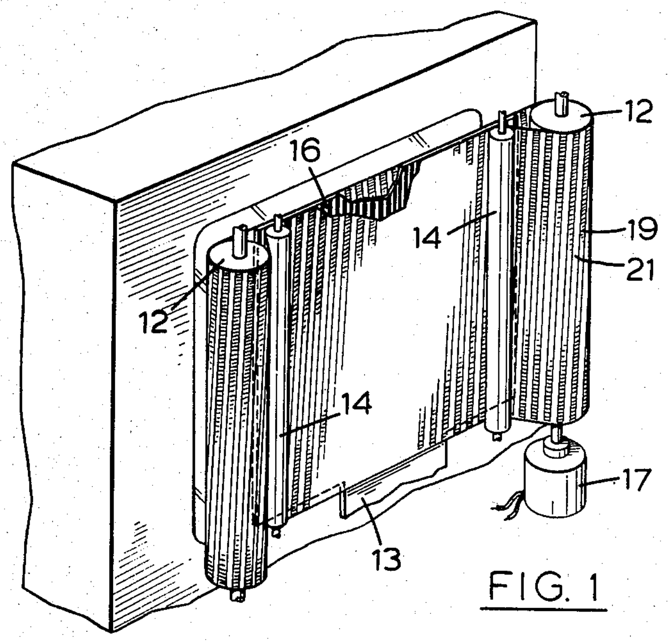
FIG. 1 shows the general arrangement of the elements in front of the television screen.

In FIG. 1 is shown a belt 10 driven by spaced rollers 12 and having intervening therebetween a substantially planar screen 16 supported in any desired manner by means 13. Idler rollers 14 are provided in addition to the spaced rollers to ensure that the belt 10 and the screen planar sections are in close proximity to one another and coparallel. Means are provided (not shown) for mounting the assembly with the planar portions of the belt or screen in close proximity to the television set and approximately parallel to the plane of the picture therein.

A motor 17 is shown for driving such belt at one of the rollers 12. Such motor 17 may be of any controllable synchronous type well known to those skilled in the art which may be driven in synchronism with the vertical scan of the television set. Means of extracting the synchronizing pulses from the television signal and comparing them with the stripe actuated signal thereby controlling the belt speed are well known to those skilled in the art.

In FIGS. 3 to 6 is shown one embodiment of the invention wherein the belt is provided with alternating opaque and transparent stripes 19 and 21 sloping slightly to the perpendicular, in the direction of belt travel and each transparent or opaque line being of a horizontal width (i.e. width measured along the belt travel direction) of the order of 0.022" as hereinafter discussed.

The height of the belt is to be slightly greater than the height of the television picture with which it is to be used and the roller assembly is arranged to place the planar portions of the belt flights close to the picture and approximately parallel to its mean plane and the planar width, as defined by the space between the idler rollers 14 is slightly greater than the width of such picture. The slope of the stripes on the belt flights is such that the upper end is advanced over the lower end in the belt flight travel direction, a distance equal to the width of a line over the adjusted frame height on the set with which the converter is being combined. Interposed between the belt flights, although it might equally be before or behind both flights, is a fixed or stationary vertical screen 16 of slightly greater than the adjusted frame height maintained in position by means 13 attached to a support not shown and substantially parallel and in close juxtaposition to the belt flights. In the embodiment being described, the screen stripes are alternately of red and cyan as indicated on the portion of the screen 16 above the belt, in each of FIGS. 3–6, where the red stripes are labelled R and the cyan S. Cyan is a color substantially half-way between blue and green. Alternatively the two colors on the stripes may be magenta and blue, with a fixed yellow filter shown in dotted form in FIG. 2 the result of the combination of the fixed yellow filter with the magenta and blue transmission stripes being a resultant effect of approximately red and cyan. It should also be noted that in some cases the screen of the set itself applies a slight coloring to the picture. In such a case it will be understood that the approximately complementary colors spoken of are the cumulative result of such slight coloring, the belt and/or screen hues and a fixed filter if used. It should be noted that, as previously discussed, two colors can cause an adequate illusion of all the spectral colors. It will also be noted that since all the color information is available in a signal, any color or colors may be selected from a signal. However, red and its approximate complement are preferred because the eye is particularly sensitive to red. The width of the colored stripes is equal to the horizontal width of the sloping stripes and therefore to the widest horizontal portion of the diamond formed by such sloping stripes and the alignment is made such that the leading edges of sloping stripes of similar optical qualities intersect on the vertical medians of stationary stripes. With this arrangement and with the belt synchronously travelling at a rate where the belt flights travel one horizontal stripe width during the vertical scan time it will be seen that, as shown in FIG. 3, there is a period when the sloping transparencies of the belt intersect to form red diamonds extending from top to bottom of the screen height, and where the remainder of the area is opaque due to one, the other or both opaque belt lines.

In general herein, it should be noted that the fixed filter is of different optical qualities from the hues used on the screen or belt. When the hues used on the screen or belt overlie one another (as when the belt has differently colored lines overlapping) the overlapping combination is substantially opaque. On the other hand when a fixed filter overlies a belt or screen stripe of different hue the effect is not to prevent light transmission but to modify the color of light through the belt or screen stripe. When it is stated herein that belt or screen stripes are such that complementary or specific hues may be obtained on light transmitted therethrough, it is understood that such complementary hues or specific hues are to be understood as existing in the stripes themselves or being obtainable by the cumulative effect of such stripes with a fixed filter and on the slight coloring of the "black and white" screen illumination.

Figures 3, 4, 5, 6:
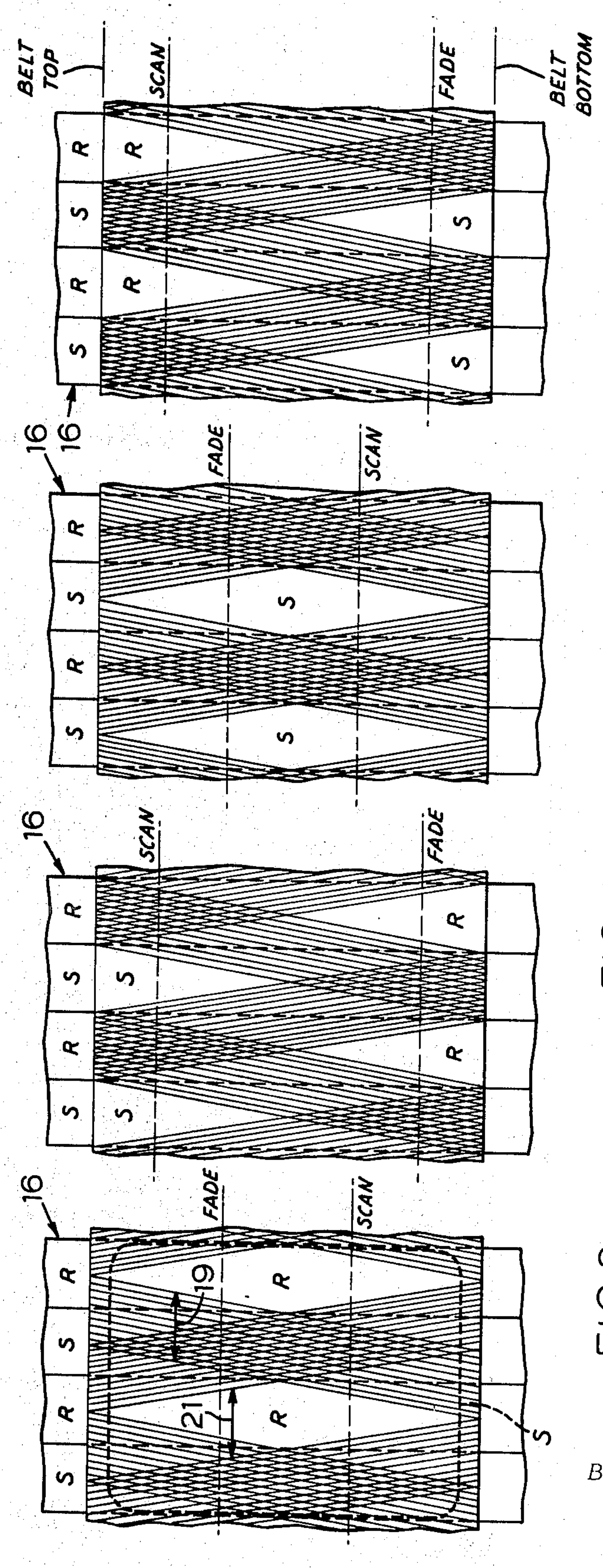
FIGS. 3 to 6 show the operation of the striped belt and the screen in one alternative of the invention, involving two colors.

In FIG. 3 and in the subsequent figures, it will be realized that the stripes have been greatly widened in relation to the height and width dimensions shown. Thus four stripes are indicated as wide enough to fill the area of the television picture, indicated by the dotted screen outline S on FIG. 3, but omitted from FIGS. 4–10 to avoid confusion with the other points to be explained in connection therewith. In fact with a 21" screen and the stripes 0.022 inch wide it will be realized that there would be about 945 stripes (either of belt or intervening screen width) across the picture width of the television set.

While the screen is shown as extending above and below the belt, this is mainly to assist in illustration and operation of the invention. As long as the screen and the parallel planar sections of the belt flights are of greater height and width than the television set picture, the function of the invention may be carried on.

Assuming that the vertical stripes are cyan and red as indicated, it will be seen that the two unshaded diamonds illustrated are pure red. The diamonds formed by one or more opaque stripes are of course opaque to the viewer. Assuming that the vertical distance on the picture tube from "scan" to "fade" of the picture information is about 30% of the television picture height, it will be seen that if the "scan" is at the location indicated by the lower dotted line and the "fade" is at the position shown by the upper dotted line, it will be seen that with the scan located as shown, almost 50% of the black and white illuminated area is available for portrayal of the red information. The degradation due to the loss of illumination is not to the eye anything like 50% and has not been noticeable to the ordinary viewer, and with the line widths used the existence of the diamonds is not apparent to the viewer. It should be further noted that where "degradation" is spoken of herein, this is in intensity and not in color information. Hence, to a certain extent, this may be compensated for by the brightness adjustment.

The area of the available visible black and white illumination represented by the width of the screen and the vertical distance between the "scan" and "fade" lines.

It will be appreciated that lines sloping upwardly to the right are moving to the right on the belt and lines sloping upwardly to the left are moving to the left on the belt. It will be appreciated that if red information is being fed to the picture tube at the time of travel of the scan line theredown, as shown in FIG. 3, that this will be portrayed through the color supplied by the red diamonds on the black and white picture seen therethrough. FIG. 4 shows the situation after the belt flights have each moved one-half stripe width and it will be seen that due to the advance of the intersecting transparencies, half a stripe width in each of the belt flight directions, the red diamond has passed half off the screen and the scan synchronized therewith no longer exists at the bottom part of the screen while the fade is approaching the bottom, while at the upper edge of the screen a cyan diamond has passed half way down the screen and the "scan" is behind this and has advanced into the screen about 15% of the vertical height. It will thus be appreciated that at the "scan," cyan information extracted from the television signal is being applied and thus the cyan portion of the color information for the picture will succeed the red down the screen and FIGS. 5 and 6 show the situation at belt travel locations one-half stripe advanced in each case.

It will thus be seen that in a further half stripe advance beyond that shown in FIG. 6, the position of FIG. 3 will be reproduced and hence FIGS. 3–6 show a complete cycle of color patterns before the television set. At the same time the motor driving the belt has been synchronized with the scan so that the scan and fade appear where indicated on the drawings and the color information has been used to control the scan in accord, alternately, with the red, and the cyan information when the scan to fade area is accompanying the red and cyan diamonds respectively and the scan information color corresponds to the color of the diamond on which the scan is superimposed. The red information is supplied at intervals of $\frac{1}{30}$ of a second, twice the normal scan interval but the individual red and cyan images are not visually separable by the viewer. In fact the viewer in accord with established theories can see an adequate color spectral range from the combined red and cyan portrayal.

Figure 2:
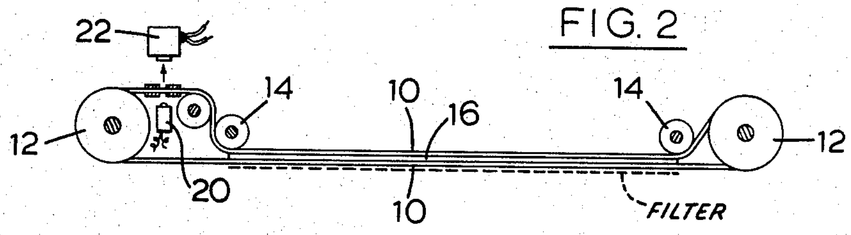
FIG. 2 shows a top view including the schematic indication of a photocell to effect synchronization or to counteract belt slip.

It is not expected with the wide rollers and the wide belt, that slippage will be encountered, but where the risk of this occurs, further synchronism means may be ensured by means schematically represented by the light 20 shown in FIG. 2 aligned with slits on opposite sides of one flight only of the belt 10 to shine onto a photocell 22. Successive pulses produced by the photocell as the belt passes which will correspond to successive stripes of the same type and will appear at interval corresponding to two vertical scan cycles and such pulse may be compared with the synchronism pulses corresponding to the occurrence of the vertical scan and the results of such comparison, used to control the roller drive motor 17 to ensure exact synchronism between the moving diamonds and the scan. It will be obvious that other comparison signals may be generated, directly by the belt and used for comparison with the vertical scan synchronous signal to ensure that the belt travel is synchronized with the vertical scan.

Alternatively the photocell produced pulses or the belt generated pulses may be used with the scan synchronism signals to control a nonsynchronous drive for the belt to achieve belt movement synchronized with the scan signal.

In FIGS. 7 to 10 there is shown an alternative picture coloring arrangement to that shown in FIGS 3 to 6. The television screen outline, although not shown may be considered as similarly located to the dotted outline in FIG. 3. The belt drive motor 17, idler rollers 14, synchronism and dimensions of coplanar portions of belt and screen will be as described for the embodiment of FIGS. 3 to 6. As shown in FIGS. 7 to 10 the screen 16 is constructed as in FIGS. 3 to 6 but the screen 16 is provided with alternating vertical transparent and opaque stripes as indicated T and O respectively above the belt height, each of thin enough width so as not to be visible to the viewer at the normal distance (in the same manner as the horizontal scan lines are not visible at a normal distance) and preferably, as before, each 0.022" wide. The belt is provided with alternating red and cyan lines labelled R and S respectively each sloping from bottom to top in the direction of belt advance, the advance due to the slope being one line width over the height of the picture on the television set being used, with the belt being driven as in the embodiment of FIGS. 3 to 7 to travel one line width during a vertical scan and flyback time.

The letters on the diamonds indicate the colors of the belt stripes making up the diamonds or parts of diamonds. The color of left-going stripes is indicated first, followed by the color of right-going stripes. Thus a diamond indicated as RS is formed of a left-going red stripe and a right-going cyan stripe. It will be realized that the parts of diamonds in front of opaque stripes are black to the viewer as are any diamonds or parts of diamonds which are formed by different colored stripes. Thus RS and SR diamonds will appear black.

As in FIGS. 3 to 7 the horizontal width of each sloping line is the same as the horizontal width of each screen line. The belt is adjusted for registration with the screen so that the leading edges of similarly colored lines on the belt flight will intersect on the vertical medians of screen stripes. With the belt at the position shown in FIG. 7 therefore, it will be seen that through the transparent screen stripes, there may be viewed the full height and width of red diamonds RR formed by intersecting red stripes on the belt (all other parts of the picture area being black), due to either the black screen stripes or overlying red and cyan stripes and that in accord with the previous discussion of belt travel, which is at the same rate as in the example of FIGS. 3–6, these red diamonds and any portion on the diamond will be synchronized to move the adjusted frame height in the time for a vertical scan including the flyback time. In order to get as much of the screen illuminated with red information as possible, the scan is synchronized with the belt travel, so that the 30% vertical height between scan and fade is approximately located as shown and it will be noted that at this time the television set will be adjusted to place on the scan the red information which is seen through the travelling red diamond, all other areas being black to the viewer, for reasons previously set out.

Figures 7, 8, 9, 10:
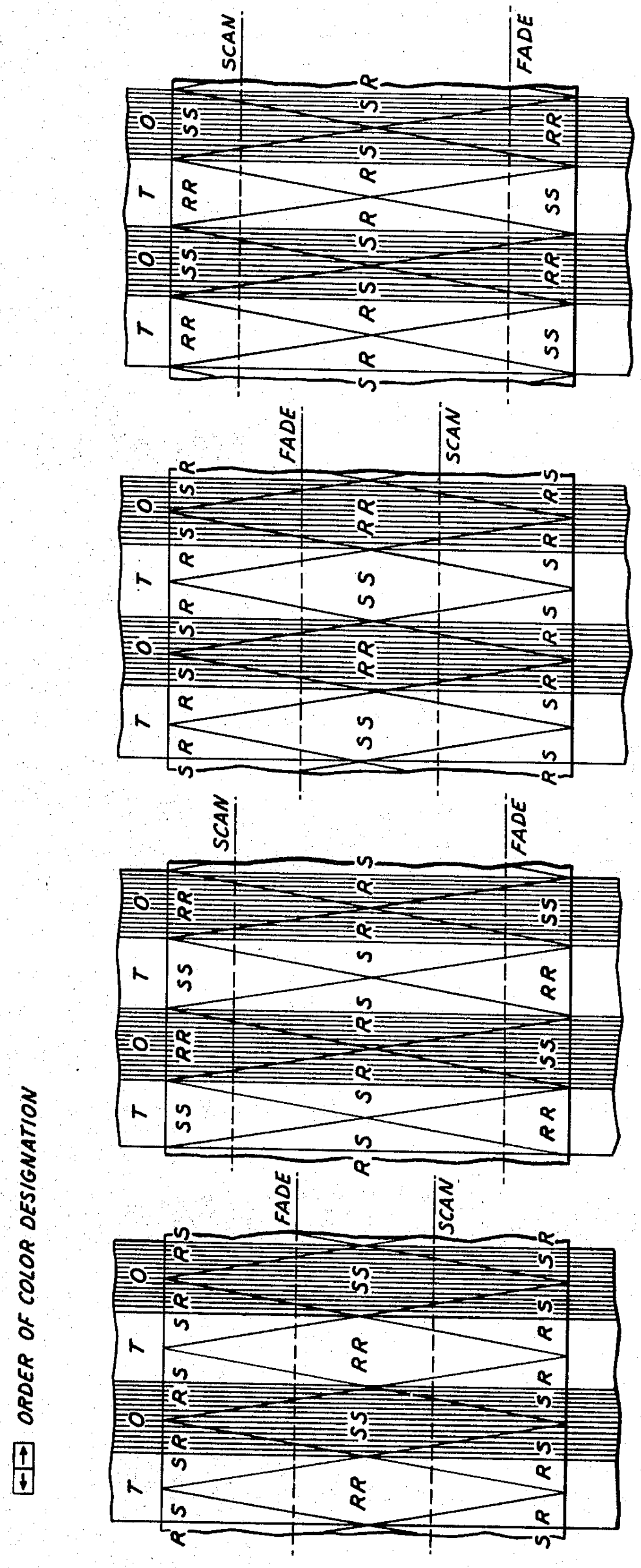
FIGS. 7 to 10 show the operation of the invention in another form using two colors.

FIG. 8 shows the situation ¼ of a color cycle later where each of the belt flights have advanced ½ of a stripe width so that the red diamond is half out of the scan area and the fade is 15% of the height from the bottom of the picture. It will be seen that the scan is now 15% down from the top and that the scan and diamond travel are adjusted as in the previous embodiment so that the 30% height between scan and fade will extend over the widest portion of a cyan diamond SS now half way down the screen. It will be seen that the cyan diamonds are caused by the intersecting cyan lines on the belt flights following the red lines that made the previous red diamond.

FIG. 9 shows the situation one quarter of a color cycle later where with another belt advance of one-half width, the cyan diamonds SS extend fully across the picture (all other areas being opaque for reasons previously explained) whereas a one-half cycle later as shown in FIG. 10 the cyan diamonds SS are one-half out the bottom, the red diamonds RR are one-half down from the top and one-half cycle from this will produce the situation again as shown in FIG. 7.

It will be readily appreciated that the percentage of the illuminated picture area, respectively illuminated with red and cyan information are the same as in the embodiment shown n FIGS. 3 to 6. However, it will be noted that alternate vertical stripes superimposed on the television picture are, in distinction to the embodiment of FIGS. 3 to 6, always black and it might be thought that this will cause an unsatisfactory illusion on the viewer. However, this is found not to be the case, and it is believed for the same reasons that the horizontal, nonilluminated stripes between scan lines in a normal television picture do not spoil the viewing of the picture.

It will be apparent that red and blue, or red and green information and belt hues could have been used instead of the red and cyan. In fact any two approximately complementary colors could be used, although combinations including red are believed best due to the eye's heightened sensitivity to red. As previously explained the belt hues may be other than complementary but such that when aligned with the picture modified by a filter and/or the picture tint produce approximately complementary colors.

As previously explained and in accord with the observations of Dr. Land and others the use of two colors will be effective to produce the illusion of any color in the spectrum.

Figure 14:
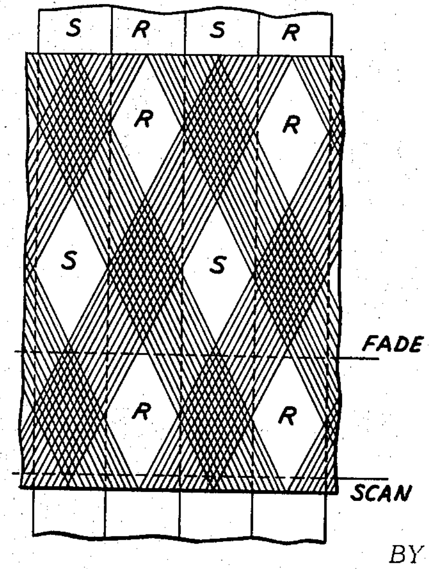
FIG. 14 shows a variation of the method shown in FIGS. 3 to 7.
Figure 13:
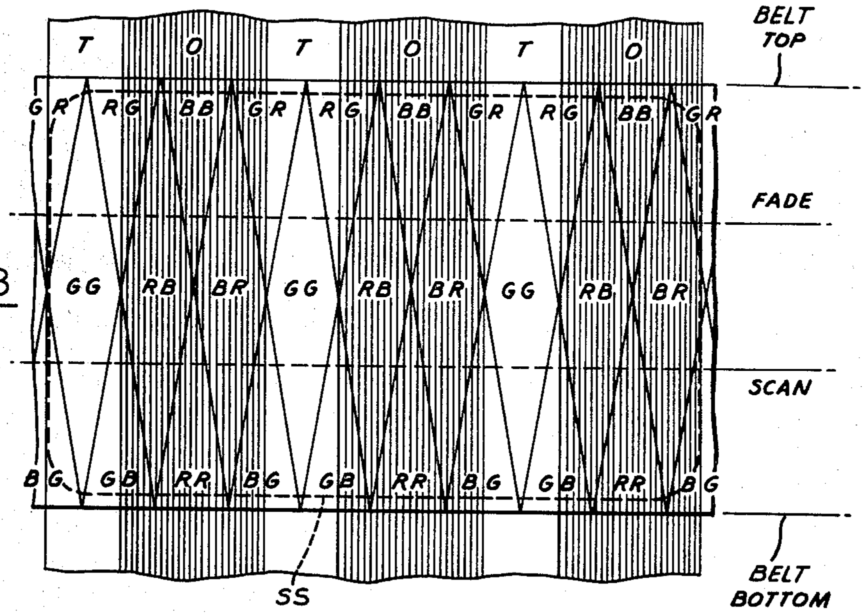

FIGS. 13 to 15 show an alternative embodiment where three colors, for example, red, blue and green, are portrayed on the screen and may in this sense achieve the advantage of an enhanced color illusion due to the use of three colors. It may in some cases exhibit a degradation of intensity and flicker in the picture because of the decreased picture illumination as demonstrated hereinafter. It is felt that the degradation and flicker will not be sufficient to be consciously noticeable and it will be noted that the brightness adjustment will, to some extent, compensate for this.

In the embodiment of FIGS. 13 to 15 the vertical screen 16 is provided with transparent stripes of the same horizontal width as the belt stripes, separated by opaque stripes of twice this width. The approximate outlines of the television screen are indicated by dotted line SS in FIG. 13 only.

It will be found that stripes of 0.022 inch are not obvious to viewers at a normal viewing distance and to achieve this width for the opaque stripes, the horizontal width of the transparent stripes must be 0.011". Stripe width in this and other embodiments may be varied to suit the design requirements to make such stripes relatively nondetectable at normal viewing distances, as is now the case of the horizontal scan lines in conventional television viewing. The belt is provided with red, blue and green stripes with the order being arbitrarily selected going from front to rear cyclically passing a stationary point in the color order named, and with the stripes being of the same horizontal width as the transparent stripes on the screen. The screen stripes are adjusted for registration with those of the belt to ensure that the leading edges of the stripes of the same color on the belt intersect along the median line of the transparent screen stripes. In the position shown in FIG. 11, it will be seen that intersecting red stripes produce red diamonds RR of the same size as discussed previously, centred vertically in the plane with the scan and fade placed as previously discussed and the television set will be adjusted so that red information governs the scan. Areas over the vertical opaque stripes are of course opaque. Areas over transparent stripes having overlying belt stripes of different colors RB, BR, RG, GR, GB and BG are also opaque. Since, on the belt flight, travelling in each direction, a blue stripe is following the red stripe, in each direction, it will be seen that as soon as the belt moves past the position shown in FIG. 13 the red diamond will begin to leave the bottom, a blue diamond will enter in the same vertical stripe from the top. Thus, when both belt flights have moved one stripe width, (here one-third of a color cycle) the arrangement will be as shown in FIG. 14 with the blue diamond centred on the screen and the scan and fade progressing with the blue diamond as shown and with blue information being placed on the screen by the scan.

Figure 11:
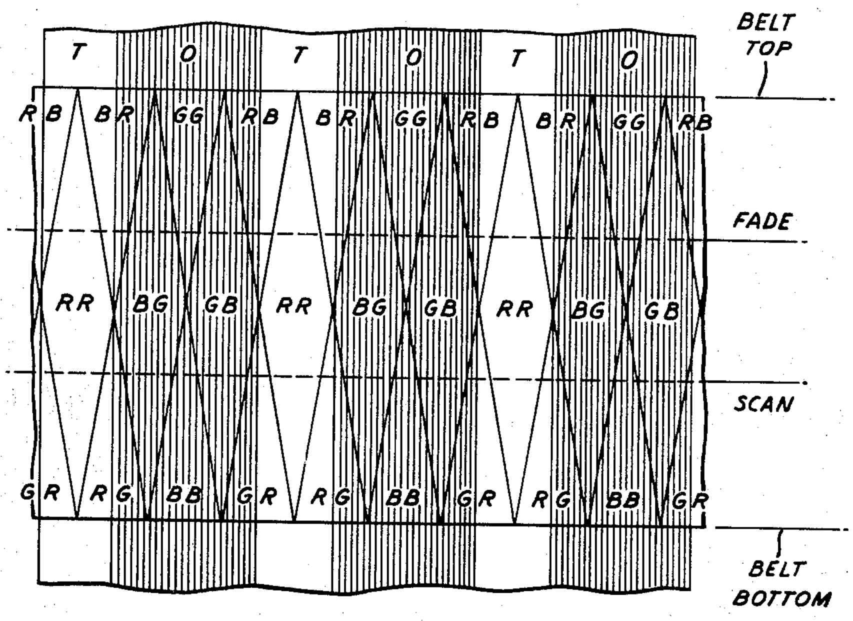
FIGS. 11 to 13 show the operation of the invention using three colors.
Figure 12:
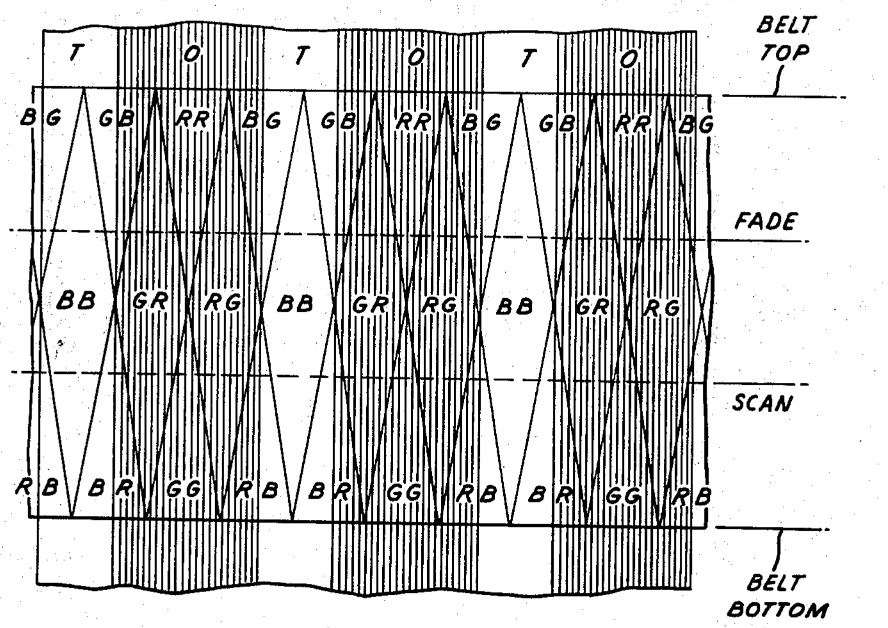

As the green stripes follow the blue in both directions on the belt, the situation one stripe width later, of belt travel, will be as shown in FIG. 13 with the green diamonds GG centred and green information being placed on the screen by the scan line and of course this represents a complete cycle since one belt stripe travel further the situation will be again as shown in FIG. 11.

In considering the brightness degradation it must not be considered as the area of the light transmitting diamonds RR, BB and GG vs the areas in the diagram shown but rather the area of the light transmitting diamond between scan and fade vs the area between the same fade and scan lines across the width of the picture.

Thus the red information will be placed on the screen at intervals of 1/20 of a second and intervening will be the green and the blue information also introduced at the same intervals. The belt is synchronized with the scan so that the scan is producing a picture in accord with the color information corresponding to the color of the diamonds RR, BB or GG overlying such scan. The color cycle repeats every 1/20 of a second, every color available in the television signal may be portrayed, and the degradation due to the reduced illuminated area although large mathematically, is not so obvious as to prevent comfortable viewing. The diamond areas represent somewhat less than 33% of the normal black and white viewing area but the human eye and brightness adjustments greatly increase the apparent area and brightness.

It is noted that the red "flicker" is much more noticeable than green or blue flickers. The problem of red flicker may to a large extent be overcome, and three basic belt hues used, by providing in the embodiment of FIGS. 7–10 that the stripes on the belt will cyclically be Red-Blue-Red-Green. The procession of transparencies down the frame will also follow this sequence and of course actuation of the scan must be synchronized and selected in the Red-Blue-Red-Green sequence. In this way the flicker rate for red will be one half that for the other two basic colors.

It is considered within the scope of this invention to include the belt, screen, optical filter, motor and auxiliary appurtenances and connections as a permanent part of a black and white television set.

In FIG. 16 there is shown a belt having alternating opaque and transparent lines where the slope of such lines is three line widths across the adjusted frame height. Between the belt flights is a screen having vertical stripes of alternating red and cyan. The belt and screen locations are synchronized so that the leading edges of stripes of the same type intersect substantially on the vertical median of the belt stripes. The result is that there are produced three vertical tiered diamond shaped transparencies across the adjusted frame height, and that the tiers alternate vertically. Thus it will be seen that the scan and fade spaced 30% of the adjusted frame height can be located as shown in the drawings, with red information being applied by the scan. It will also be seen that with a belt travel of three lines width during the vertical scan time the scan will follow the cyan diamond tier next to enter after movement from the position shown in FIG. 10. (Thus odd cyan tiers and odd red tiers will not be used.) Thus the tinted transparencies may be made to correspond to color information, alternately portraying red and cyan information. The degradation will be greater than with the line slope of one stripe width.

It will be seen that to achieve synchronism the slope must always be such that with two colors the number of diamonds in the vertical screen height is odd. However the degradation is such that the diamonds cannot be less than 20% of the screen height and hence the maximum slope will be 5 line widths across the adjusted frame height and the alternatives are offsets of 1, 3 and 5 line widths since even and fractional line offset will not achieve synchronism. Similarly the embodiment of FIGS. 7–10 may have horizontal line offsets of 1, 3 or 5 line widths with successive red and cyan transparencies following in the same instead of alternate vertical paths. With the belt striped in three colors, line offsets of 1, 2, 4 or 5 offsets may be used but the intensity degradation will be substantial and 3 widths will not achieve the result since the same color transparency will travel down with successive vertical scans. Generally the offset must be an integral number of widths, over the adjusted frame height, which integral number cannot be equal to or a multiple of the number of belt stripes in a cycle.

I claim:

1. A device for use in the converting of a black and white television set to produce color comprising:

an assembly comprising a belt extending substantially horizontally;

means for moving said belt at controllable speed;

means for maintaining extents of the two flights of the belt substantially parallel and in close proximity to one another;

said assembly being mountable so that coplanar extents are vertical in front of a television set with the belt travel direction horizontal;

the dimensions of the parallel portions of said belt flights being slightly greater than the dimensions of the picture of the television set with which said converter is used;

said belt being provided with stripes where the stripes encountered in a horizontal direction along the belt are alternately opaque and transparent;

said stripes being of equal horizontal width of between .001 and .125", parallel sided and parallel to each other; and extending with the major component of said strip direction extending transversely of the direction of belt movement;

but sloped at an angle to have the upper end of each stripe advanced over the lower end in the direction of belt movement by an odd integral number of widths of one of said stripes over the adjusted frame height of such picture;

whereby in line of sight through said two belt flights diamond shaped transparencies travel at right angles to the direction of travel of said belt and travel the height of such picture during the travel of said belt through the distance equal to said advance;

whereby said belt may be synchronously driven at such a rate that a transparency travels the height of a television picture during the cycle time of a vertical scan; and a screen;

means for maintaining said screen parallel and in close proximity to said parallel portions of said belt;

said screen being provided with vertical stripes, of the width of the widest horizontal dimensions of said diamonds;

said screen stripes being transparent and of alternate hues so that approximately complementary colors may be obtained on light transmitted therethrough;

sad screen being mounted in registration with said belt so that the leading edges of oppositely travelling belt stripes approximtely intersect on the vertical medians of screen stripes during the downward travel of said intersection.

2. A device as claimed in claim 1 wherein the slope angle of stripes on said belt is defined by an advance of one stripe width, of the upper end over the lower end of a stripe over said adjusted frame height.

3. A device as claimed in claim 2 wherein said screen stripes are alternately colored so that red and an approximately complementary color may be obtained on light transmitted therethrough from a television screen.

4. A device as claimed in claim 1 wherein said screen stripes are alternately colored so that red and an approximately complementary color may be obtained on light transmitted therethrough.

5. A device for use in the converting of a black and white television set to produce color comprising:

an assembly comprising a belt extending substantially horizontally;

means for moving said belt at controllable speed;

means for maintaining extents of the two flights of the belt substantially parallel and in close proximity to one another;

said assembly being mountable so that coplanar extents are vertical in front of a television set with the belt travel direction horizontal;

the dimensions of the parallel portions of said belt flights being slightly greater than the dimensions of the picture on the television set with which said converter is used;

said belt being provided with transparent stripes where the stripes encountered in a horizontal direction along the belt are alternately of two different colors approximately complementary to one another;

said stripes of equal horizontal width of between .001" and .125", parallel sided and parallel to each other and extending with the major component of said stripe direction extending transversely of the direction of belt travel, but sloped at an angle to have the upper end of each stripe advanced over the lower end, in the direction of belt movement by an odd intgral number of widths of one of said stripes over the adjusted frame height of such picture;

whereby in line of sight though said two belt flights, diamond shaped transparencies, formed by the overlapping areas of similarly colored stripes on the two belt flights, travel at right angles to the direction of travel of said belt and travel the height of such picture during the travel of said belt through the distance equal to said advance;

whereby said belt may be synchronously driven at such a rate that a transparency travels the height of a television picture during the cycle time of a vertical scan;

a screen;

means for maintaining said screen parallel and in close proximity to said parallel portions of said belt;

said screen being provided with vertical stripes, of the width of the widest horizontal dimensions of said diamonds;

said screen stripes being alternately opaque and transparent;

said screen being mounted in registration with said belt so that the leading edge of oppositely travelling belt stripes approximately intersect on the vertical medians of screen stripes during the downward travel of said intersection.

6. A device as claimed in claim 5 wherein the slope angle of stripes on said belt is defined by an advance of one stripe width of the upper end over the lower end of a stripe, over said adjusted frame height.

7. A device as claimed in claim 6 wherein said belt stripes are alternately colored so that red and an approximately complementary color may be obtained on light transmitted therethrough.

8. A device as claimed in claim 5 wherein said belt stripes are alternately colored so that red and an approximately complementary color may be obtained on light transmitted therethrough.

9. A device for use in the converting of a black and white television set to produce color comprising:

an assembly comprising a belt extending substantially horizontally;

means for moving said belt at controllable speed;

means for maintaining extents of the two flights of the belt substantially parallel and in close proximity to one another;

said assembly being mountable so that coplanar extents are vertical in front of a television set with the belt travel direction horizontal;

the dimensions of the parallel portions of said belt flights being slightly greater than the dimensions of the picture of the television set with which said converter is used;

said belt being provided with transparent stripes where the stripes encountered in a horizontal direction along the belt are colored in three colors, in an order cyclically repeated;

said stripes being of equal horizontal width of between .001" and .125" being parallel sided and parallel to each other; and extending with the major component of said strip direction extending transversely of the direction of belt movement;

but sloped at an angle to have the upper end of each stripe advanced over the lower end in the direction of belt movement by an integral number of widths of one of said stripes over the adjusted frame height of such picture, where the integer is selected from the class 1, 2, 4, 5;

whereby in line of sight through said two belt flights, diamond shaped transparencies, formed by the overlapping areas of similarly colored stripes on the two belt flights, travel at right angles to the direction of travel of said belt and travel the height of such picture during the travel of said belt through the distance equal to said advance;

whereby said belt may be synchronously driven at such a rate that a transparency travels the height of a television picture during the cycle time of a vertical scan;

a screen;

means for maintaining said screen parallel and in close proximity to said parallel portions of said belt;

said screen being provided with vertical transparent stripes of the width of the widest horizontal dimensions of said diamonds alternating with opaque stripes of twice said last-mentioned width;

said screen being mounted in registration with said belt so that the leading edges of oppositely travelling belt stripes of the same color intersect on the vertical medians of transparent screen stripes during the downward travel of said intersection.

10. A device as claimed in claim 9 wherein the slope of stripes on said belt is defined by an advance of one stripe width of the upper end over the lower end of a stripe over said adjusted frame height.

11. A device as claimed in claim 10 wherein a cycle of the cyclic order is first color, second color, third color.

12. A device as claimed in claim 10 wherein one of the three colors is red and a cycle of the cyclic order is red, second color, red, third color.

13. A device as claimed in claim 9 wherein a cycle of the cyclic order is first color, second color, third color, etc.

14. A device as claimed in claim 13 wherein one of the three colors is red and a cycle of the cyclic order is red, second color, red, third color.

References Cited

UNITED STATES PATENTS

| | | | |
|---|---|---|---|
| 2,720,553 | 10/1955 | Toulon | 178—5.4 |
| 2,728,814 | 12/1955 | Berger | 178—5.4 |

RICHARD MURRAY, Primary Examiner